Aug. 16, 1927.
M. BIRKIGT
1,639,583
VALVE GEAR OPERATING DEVICE
Filed July 18, 1924  2 Sheets-Sheet 1
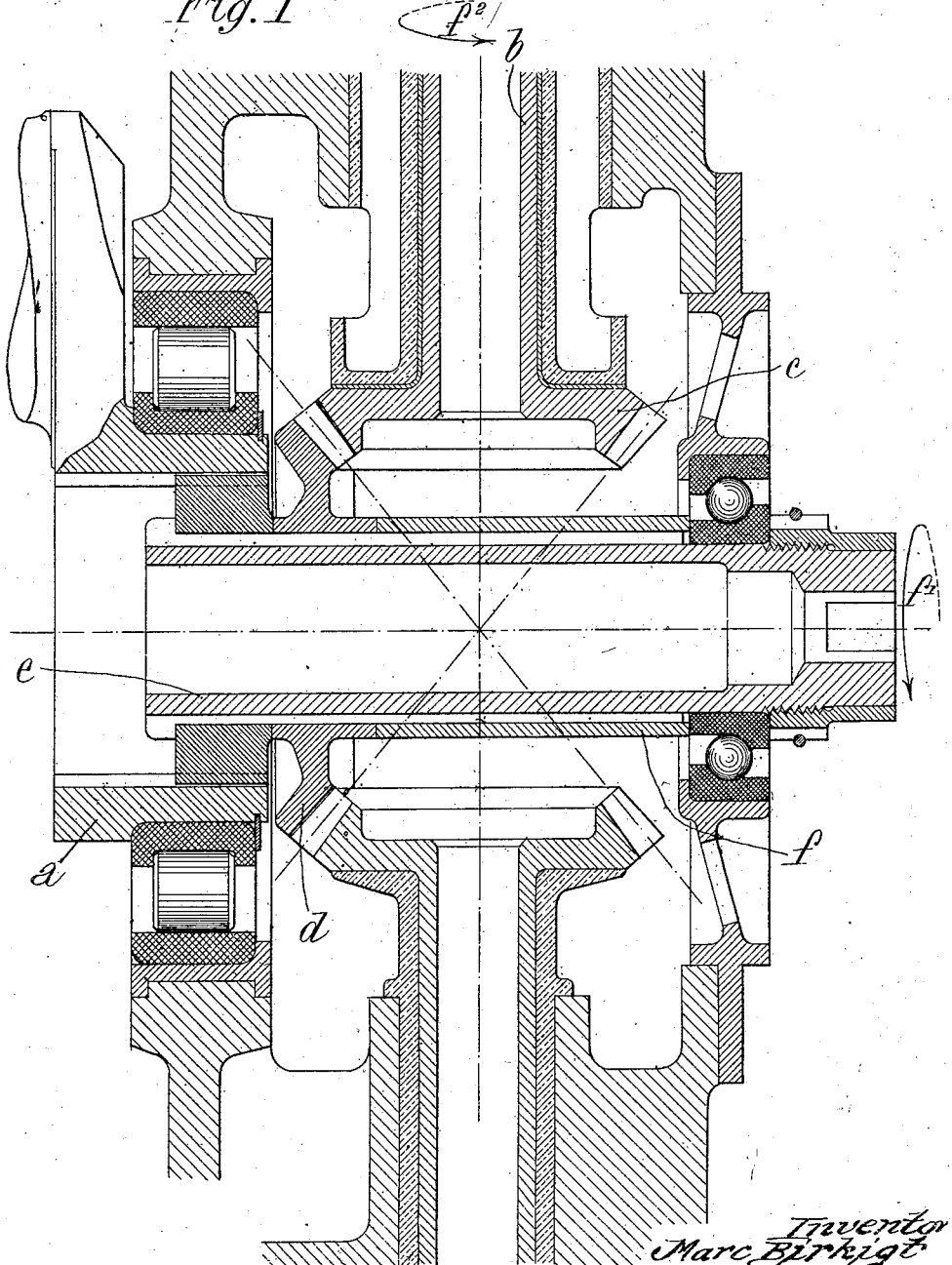

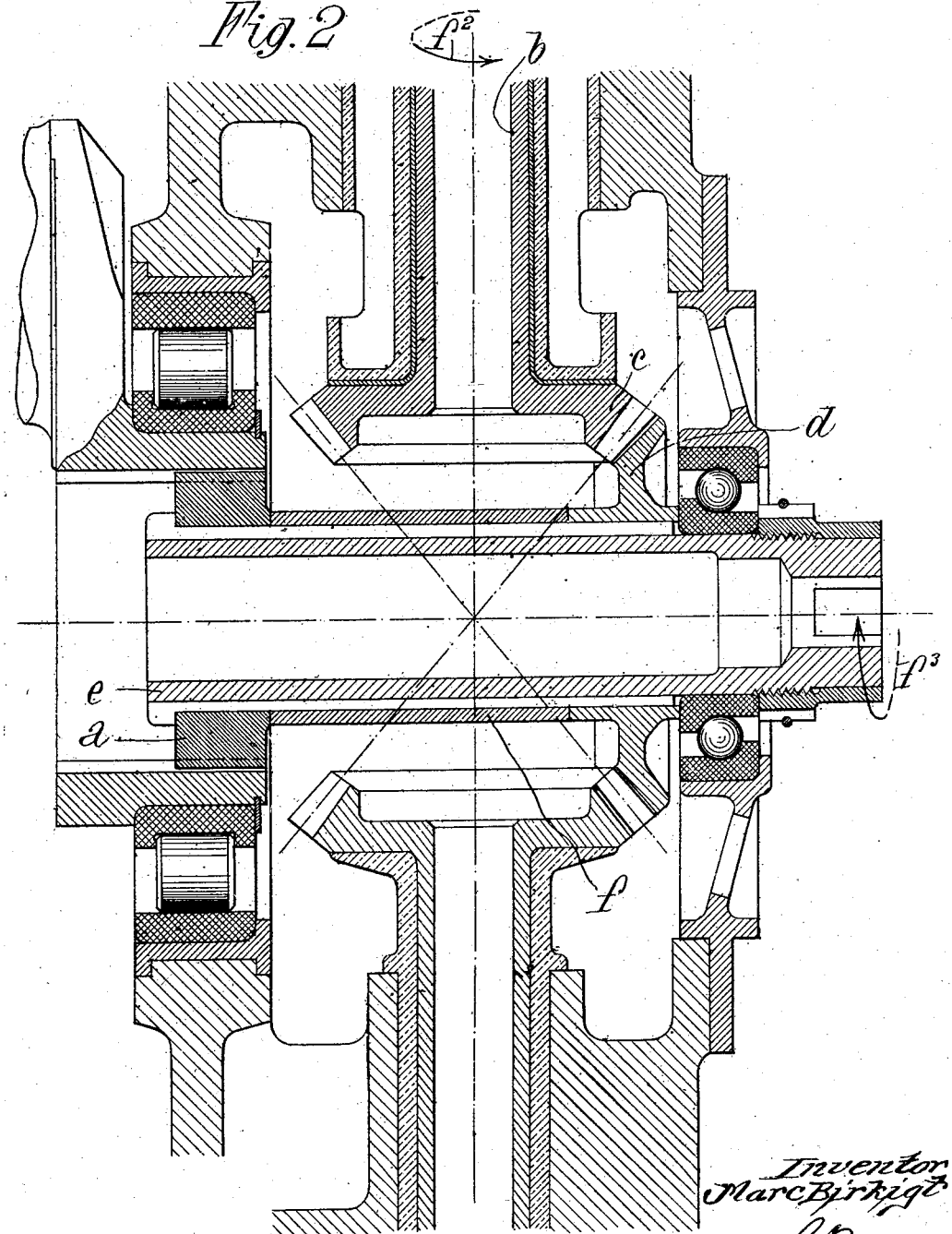

Patented Aug. 16, 1927.

1,639,583

UNITED STATES PATENT OFFICE.

MARC BIRKIGT, OF BOIS COLOMBES, FRANCE.

VALVE-GEAR-OPERATING DEVICE.

Application filed July 18, 1924, Serial No. 726,875, and in Belgium July 18, 1923.

The invention relates to devices for operating valve gears by means of a shaft in piston engines, more particularly internal combustion engines.

The invention has for its object to make these devices of such a nature that the engines comprising them are transformed so that the direction of rotation thereof is reversed without it being necessary to introduce new elements or modify the existing elements.

The invention mainly consists in providing the devices referred to with a transmission, one member of which is reversible and may take up two positions, one of which corresponds to the engine turning clockwise and the other anti-clockwise, these positions being such that the valve operating shaft is always rotated in the same direction, whatever be the direction in which the engine turns.

The invention consists, also in certain other arrangements, more particularly described hereunder and claimed in the claim.

The invention will be clearly understood from the following description and accompanying drawings, given by way of example.

Figure 1 of the drawings is a longitudinal section through the axis of the crank shaft, showing the detail of a portion of the valve operating gear of an internal combustion engine.

Figure 2 shows in the same way the same detail transformed to allow of the engine turning in a direction opposite to the preceding one.

The various elements other than the valve-gear operating means to be fitted to the engine, are made in any suitable manner.

According to the invention, the valve operating means are made by interposing between the crank shaft $a$ and the valve operating shaft $b$, a suitable transmission, constituted for example by two bevel pinions one of which $c$ is mounted on the shaft $b$ and the other $d$ is mounted with a long key on the shaft $e$ secured to the crank shaft and held in position by a sleeve $f$ long enough to prevent any play of the gear-wheel $d$ on the shaft $e$.

Thus, if the elements are assembled as shown in Figure 1, a device is obtained whereby when the crank shaft rotates in the direction of the arrow $f^1$ the valve operating shaft is driven in the direction of the arrow $f^2$.

If the assembling is done as shown in Figure 2, that is to say by reversing the position of the gear-wheel $d$, a device is obtained whereby if the shaft turns in the direction of the arrow $f^3$, that is to say, in the opposite direction to $f^1$, the valve operating shaft $b$ is driven in the same direction as before, that is to say the various phases of valve operation take place in their normal succession.

Obviously, the invention is not limited to the construction described, but includes any modifications within the scope of the claim.

Having now particularly described and ascertained the nature of my said invention and in what manner the same is to be performed, I declare that what I claim is:—

A valve operating gear for piston engines of the internal combustion and like type including a crank shaft and a valve operating shaft disposed at right angles to each other, of a third shaft axially alined with said crank shaft and keyed thereto, cooperating beveled gears on said valve operating shaft and said third shaft, the gear on said third shaft being capable of reverse positioning whereby said valve operating shaft may be rotated in opposite directions.

In testimony whereof I have hereunto set my hand.

MARC BIRKIGT.